UNITED STATES PATENT OFFICE.

CASIMIR JAMES HEAD, OF LONDON, ENGLAND.

PROCESS FOR THE MANUFACTURE OF CHROMIC OXIDE AND SODIUM SULPHIDE FROM SODIUM CHROMATE.

1,422,703.  Specification of Letters Patent.  Patented July 11, 1922.

No Drawing.  Application filed January 14, 1921. Serial No. 437,158.

*To all whom it may concern:*

Be it known that I, CASIMIR JAMES HEAD, a subject of the King of Great Britain and Ireland, residing at Norfolk House, Laurence Pountney Hill, London, in the county of London, England, have invented new and useful Improved Processes for the Manufacture of Chromic Oxide and Sodium Sulphide from Sodium Chromate, of which the following is a specification.

This invention relates to an improved process for the manufacture of chromic oxide and sodium sulphide from sodium chromate, and has for its object the direct production of chromic oxide as a commercially pure product free from sulphur suitable for the reduction to metallic chromium powder by any of the well known methods, such as by aluminium powder and the like.

In the present state of the art the manufacture of chromic oxide from sodium chromate is represented by the following formula:—

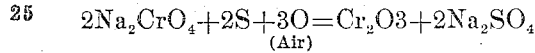

This mixture is subjected to heat under oxidizing conditions with the result that sodium sulphate is formed, and the chromic oxide produced is contaminated with sulphur, rendering the latter unfit for use in the manufacture of high grade chromium alloys.

The invention consists in a process comprising the addition of a suitable reducing agent such as charcoal, coal, coke, or the like and sulphur to the sodium chromate and controlling the temperature at which the operation is performed for a sufficient period of time to complete the reaction under reducing conditions thereby enabling sulphur free chromic oxide together with sodium sulphide on a commercial scale to be produced.

By way of example the process may be put into practical effect by taking sodium chromate and intermixing it thoroughly with the correct molecular quantities of sulphur and carbon as set out in the following equation:—

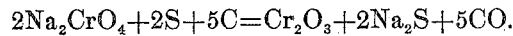

This mixture is then heated in a retort, muffle or other suitable heating chamber to a dull red heat, for a sufficient length of time to complete the chemical reaction, during which chromic oxide, sodium sulphide, and carbon monoxide are formed.

When the mass has cooled it is lixiviated with water (which may be heated to facilitate solution) to dissolve out the sodium sulphide, the chromic oxide $Cr_2O_3$ being insoluble is separated from the sodium sulphide solution by filtration, decantation or other suitable operation and washed, dried, calcined and treated to prepare a product ready for use. The sodium sulphide liquor may be evaporated to leave a dry residue, viz. sodium sulphide $Na_2S$.

The chromic oxide may be further purified if necessary by, for example, digesting it with an alkaline solution such as a solution of sodium carbonate and finally with hot water to remove the excess soda.

The solid residue may then be dried and ground to powder which is in a suitable condition for reduction to a metallic state or other purposes, wherein a commercially pure chromic oxide is desirable.

I claim:

A process for the preparation of sulphur free chromic oxide ($Cr_2O_3$) and sodium sulphide ($Na_2S$) from sodium chromate ($Na_2CrO_4$) comprising mixing five parts of carbon (5C) two parts of sulphur (2S) with two parts of sodium chromate ($2Na_2CrO_4$) so as to produce a mixture of correct molecular proportions to produce the desired result, heating the mixture to a dull red heat in a closed chamber until the reaction is completed, treating the residue with water to dissolve the sodium sulphide ($Na_2S$), separating the insoluble chromic oxide ($Cr_2O_3$) from the solution, washing, drying, calcining and treating the said chromic oxide ($Cr_2O_3$) to suitably purify it and prepare it for use substantially as described.

In testimony whereof I have signed my name to this specification in the presence of two subscribing witnesses.

CASIMIR JAMES HEAD.

Witness:
DORIS HITCHCOCK.